United States Patent
Fadell et al.

(10) Patent No.: US 10,816,424 B2
(45) Date of Patent: Oct. 27, 2020

(54) REMOTE SEAL DIAPHRAGM SYSTEM

(71) Applicant: Rosemount Inc., Shakopee, MN (US)

(72) Inventors: Paul Ryan Fadell, Cypress, TX (US); Scott Robert Thompson, Lakeville, MN (US); Nathan Darrel Stokes, Chaska, MN (US)

(73) Assignee: ROSEMOUNT INC., Shakopee, MN (US)

( * ) Notice: Subject to any disclaimer, the term of this patent is extended or adjusted under 35 U.S.C. 154(b) by 181 days.

(21) Appl. No.: 16/137,930

(22) Filed: Sep. 21, 2018

(65) Prior Publication Data

US 2020/0096404 A1    Mar. 26, 2020

(51) Int. Cl.
*G01L 9/00* (2006.01)
*G01L 9/12* (2006.01)
*G01L 19/04* (2006.01)

(52) U.S. Cl.
CPC .................... *G01L 9/125* (2013.01)

(58) Field of Classification Search
CPC ..... G01L 9/00–12; G01L 9/125; G01L 13/00; G01L 13/02; G01L 19/00; G01L 19/04
See application file for complete search history.

(56) References Cited

U.S. PATENT DOCUMENTS

| | | | |
|---|---|---|---|
| 5,811,690 A * | 9/1998 | Hershey | .................. G01F 23/18 73/299 |
| 7,937,989 B2 | 5/2011 | Marchesi | |
| 2013/0253857 A1 | 9/2013 | Hershey | |

FOREIGN PATENT DOCUMENTS

| | | |
|---|---|---|
| JP | 11-14483 | 1/1999 |
| WO | WO 96/27124 | 9/1996 |

OTHER PUBLICATIONS

Notification of Transmittal of the International Search Report and the Written Opinion of the International Searching Authority from International Application No. PCT/US2019/038720, dated Oct. 7, 2019.
Office Action from Chinese Patent Application No. 201822226911.2, dated Jun. 3, 2019.

* cited by examiner

*Primary Examiner* — Nguyen Q. Ha
(74) *Attorney, Agent, or Firm* — Westman, Champlin & Koehler, P.A.

(57) ABSTRACT

A transmitter for measuring a process pressure includes a pressure sensor and a temperature sensor providing an input temperature signal. A first remote pressure sensitive diaphragm couples to the transmitter by a first capillary tube filled with a fill fluid having a density as a function of fill fluid temperature. An input circuit is operably connected to at least the pressure sensor and provides an intermediate pressure signal at least roughly representative of the process pressure. A correcting circuit is coupled to the temperature sensor and to the input circuit. The correcting circuit processes the intermediate pressure signal by compensating for the fill fluid density as a function of the temperature and provides a compensated output more closely representative of the process pressure. The correction circuit further performs an initial height determination based upon a pressure measurement made while no pressure is applied to the first diaphragm.

21 Claims, 5 Drawing Sheets

REMOTE SEAL DIAPHRAGM SYSTEM

BACKGROUND

This invention relates to a pressure transmitter having a remote diaphragm for measuring pressure of a process medium. More particularly, the present invention relates to providing a corrected transmitter output to compensate for measurement errors caused by the remote diaphragm.

Transmitters sensing process variables, such as differential pressure, gage pressure and process temperature, are known. The transmitters typically are mounted in the vicinity of a process medium to be measured, at a process control industry installation. Transmitters provide an output representative of sensed process variables. This output is then communicated over a two-wire current loop or wirelessly to a remote control room.

In many cases, the transmitter has a transmitter housing that contains a pressure sensor and one or two diaphragms fluidically coupled to the pressure sensor. The process medium to be measured is plumbed to the transmitter housing to contact the diaphragm(s), and the diaphragm(s) transmit the process medium pressure to the pressure sensor. In other cases, a transmitter system includes a remote diaphragm separated from the transmitter housing by a capillary tube, which tube is typically flexible and can have a length of a fraction of a meter or as long as tens of meters. The process medium contacts the remote diaphragm, which conveys the exerted pressure to the pressure sensor disposed in the transmitter housing via a substantially incompressible fluid filling the capillary tube.

These latter transmitters, utilizing one or more remote diaphragms, are the subject of the present invention. Existing remote diaphragms are subject to potential errors caused by temperature changes of the surroundings. With a constant process medium pressure, the transmitter output can change with the outside ambient temperature due to thermal effects on the remote diaphragm, and the connected capillary tube. The resulting errors are dependent on the vertical position of the remote diaphragm relative to the transmitter. (Or the vertical distance between two remote diaphragms.) Because the vertical distance between the remote diaphragm and the transmitter is specific to a selected installation, predetermination of the thermal effects is difficult.

Known remote diaphragm transmitters have a temperature sensor disposed in the transmitter housing, and the output of such temperature sensor is used by the transmitter circuitry to provide a relatively accurate transmitter output, corrected for the thermal response of the various transmitter components. Some transmitters correct for temperature changes of installation-specific remote diaphragm systems where there is a net vertical separation between the remote diaphragms as shown in International Application No. PCT/US95/02037, entitled PRESSURE TRANSMITTER WITH REMOTE SEAL DIAPHRAGM AND CORRECTION CIRCUIT THEREFOR, PUBLISHED Sep. 6, 1996. (See also JPH 1114483A, entitled DIAPHRAGM SEAL TYPE DIFFERENTIAL PRESSURE MEASURING DEVICE, issued on Jan. 22, 1999.) However, such systems can be difficult to commission and require complex steps for proper installation in an industrial facility.

SUMMARY

A transmitter for measuring a process pressure includes a pressure sensor and a temperature sensor providing an input temperature signal. A first remote pressure sensitive diaphragm couples to the transmitter by a first capillary tube filled with a fill fluid having a density as a function of fill fluid temperature. An input circuit is operably connected to at least the pressure sensor and provides an intermediate pressure signal at least roughly representative of the process pressure. A correcting circuit is coupled to the temperature sensor and to the input circuit. The correcting circuit processes the intermediate pressure signal by compensating for the fill fluid density as a function of the temperature and provides a compensated output more closely representative of the process pressure. The correction circuit further performs an initial height determination based upon a pressure measurement made while no pressure is applied to the first diaphragm.

This Summary and the Abstract are provided to introduce a selection of concepts in a simplified form that are further described below in the Detailed Description. The Summary and the Abstract are not intended to identify key features or essential features of the claimed subject matter, nor are they intended to be used as an aid in determining the scope of the claimed subject matter.

DETAILED DESCRIPTION OF ILLUSTRATIVE EMBODIMENTS

Remote seal capillary systems can successfully compensate for errors generated from fluid expansion due to process and ambient temperatures. See FIG. 2 for an example of this error. The density changes with any change in ambient temperature, which can vary both day-to-night (micro) and seasonally (macro) when mounted outdoors.

Figure 1:
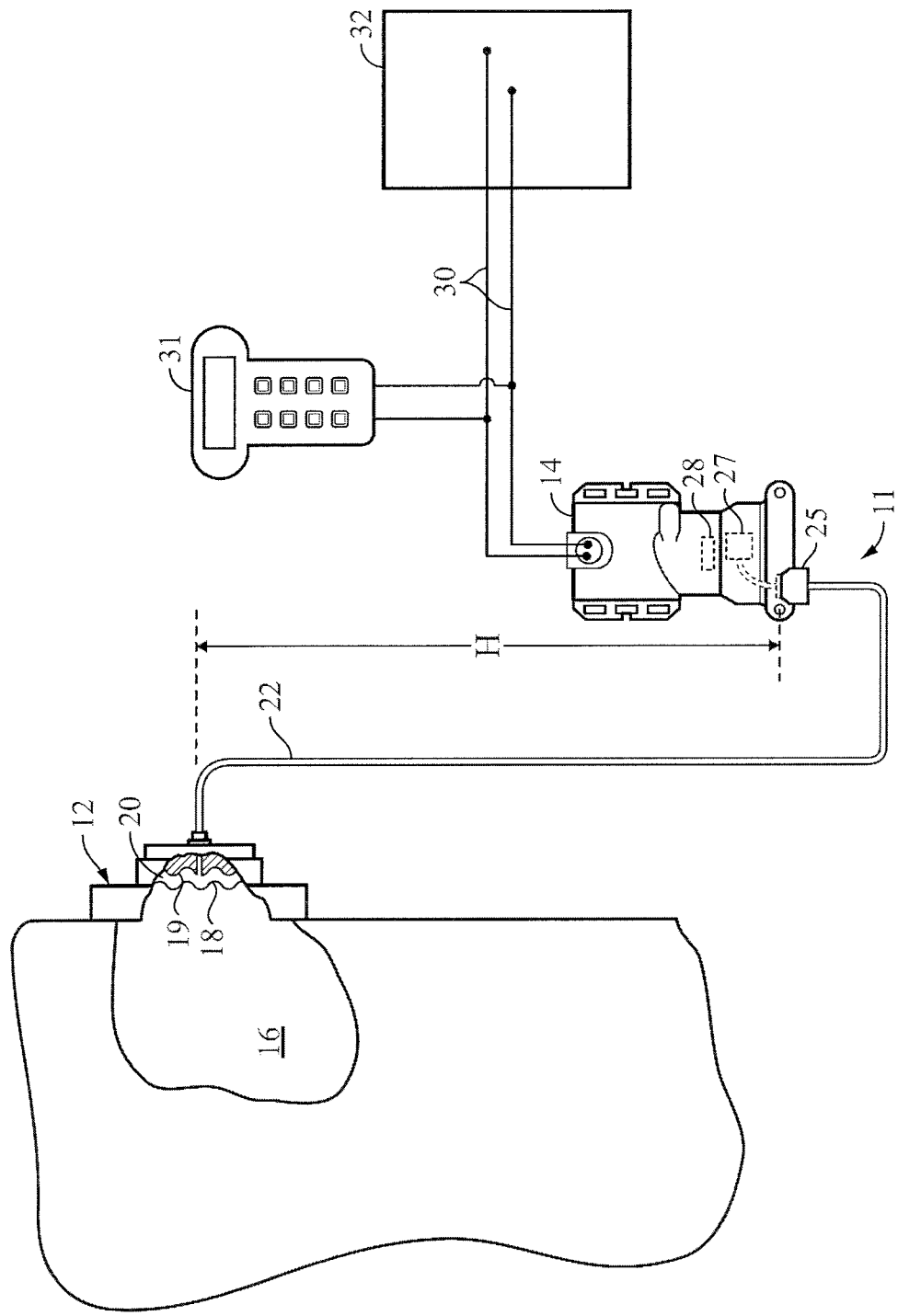
FIG. 1 is a schematic elevational view of a transmitter having a remote diaphragm system in an installation where a gage pressure or an absolute pressure of a process medium is measured.

FIG. 1 shows an example of a typical transmitter 11 having a remote diaphragm system 12 connected to a transmitter housing 14. The transmitter 11 measures the pressure of a process medium (process fluid) 16. The remote diaphragm system 12 includes a thin, flexible diaphragm 18 which contacts the process medium 16. System 12 also includes backplate 19 which, together with diaphragm 18, define a cavity 20. Capillary tube 22 couples cavity 20 to a pressure sensor 27 disposed in transmitter housing 14, such coupling being made via a transmitter housing diaphragm 25 and a sealed fluid system connecting diaphragm 25 with sensor 27. The sealed fluid system, as well as cavity 20 and capillary tube 22, is filled with a suitable fluid (not shown) for transmitting the process pressure to sensor 27. Fluid may include silicone oil, glycerin and water, propylene glycol and water, or any other suitable fluid which preferably is substantially incompressible.

When process pressure is applied from process medium 16, diaphragm 18 is typically displaced thus transmitting the measured pressure from remote diaphragm system 12 through a passage in plate 19 and through tube 22 to pressure sensor 27. The resulting pressure applied to pressure sensor 27, which can be a capacitance-based pressure cell, causes such capacitance to change. Sensor 27 can also operate on other known sensing principles, such as strain gauge technology. Circuitry within transmitter housing 14 electronically converts the capacitance into, for example, a linear 4-20 mA transmitter output signal over wire pair 30 (two wire process control loop) indicative of the process pressure.

In one embodiment, a remote seal diaphragm system is provided in which a vertical distance between a process connection and a pressure sensor is calculated. The calculated distance can then be used to correct for errors in pressure measurements caused by temperature variations. Transmitter housing 14 includes a temperature sensor 28 which measures the temperature locally at the transmitter housing.

Transmitter housing 14 includes circuitry (not shown in FIG. 1) which measures and compensates for temperature variations, and provides an output over wire pair 30. Temperature is measured using a temperature sensor 28. The output can be digital or analog. In one configuration, the transmitter 11 is completed powered with power received through the two wire process control loop 30. In another example configuration, connection 30 is representative of an RF connection to a remote location. Such an RF connection can be in accordance with industry standard communication techniques such as WirelessHART® or other techniques including techniques which implement a mesh network. In such a configuration, the transmitter 11 may include some source of local power including a battery or power connection, solar cell arrangement, etc.

FIG. 1 also illustrates a local operator interface 31 which can comprise, for example, a hand held communicator such as the 475 field communicator available from Emerson Automation Solutions of Shakopee, Minn. Such a communicator 31 can couple to the process control loop 30 and can be used in provisioning the transmitter 11 during installation as discussed below in more detail. Additionally, in some configurations, the hand held communicator 31 can communicate with process variable transmitter using RF communication techniques including WirelessHART®, other wireless communication techniques, Bluetooth®, etc. RFID communication techniques may also be employed as well as local wired techniques including a USB connection.

The vertical distance H between diaphragm 25 and diaphragm 18 introduces a fill fluid density effect error which is a function of both H and temperature (T) of the fill fluid between diaphragms 25,18. The pressure measured by transmitter 11 can be expressed as:

$$\text{Measured Pressure} = P_{PROCESS} + P_{ERROR} \quad \text{EQ. 1}$$

where:

$$P_{ERROR} = P(T,H) - \text{Fill fluid density effect} \quad \text{EQ. 2}$$

and $$P_{PROCESS} = \text{TrueProcessPressure} \quad \text{EQ. 3}$$

According to the invention, the transmitter output is corrected for at least the fill fluid density effect error. This invention includes a calculation method to both 1) calculate the vertical distance between process connections and 2) use that value to compensate for the change in fill fluid density during changes in ambient temperature in vertically-mounted remote seal capillary systems.

Figure 2:
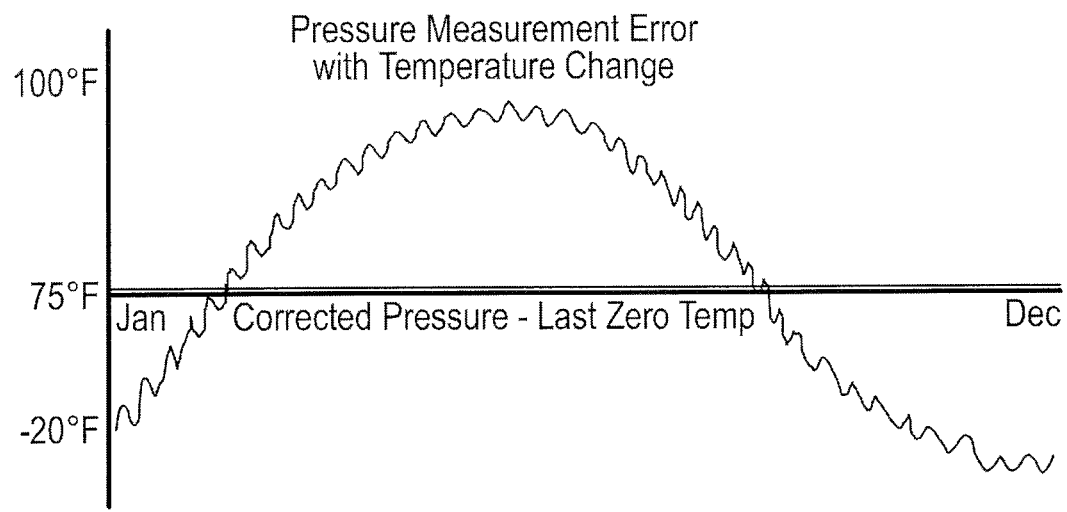
FIG. 2 is a graph showing changes in pressure measurements due to temperature variations.

Ambient temperatures vary day-to-day and season-to-season, affecting and the process pressure reading and subsequent processes and equipment. Such errors are illustrated in the graph of FIG. 2. This compensation method will calculate the pressure error due to this effect and subtract it from the initial sensor reading, providing the user with a more accurate measurement that does not vary from seasonal and daily temperature changes.

Figure 3:
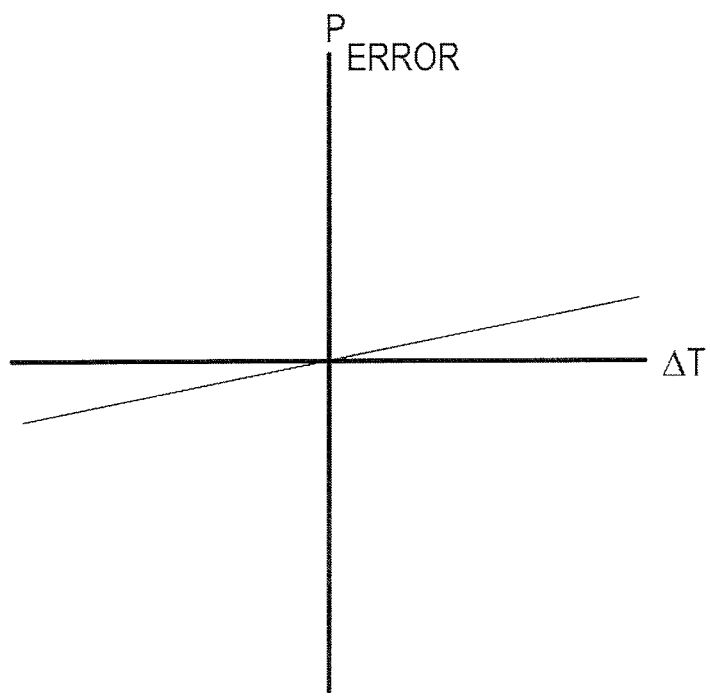
FIG. 3 is a graph of fill fluid density effect as a function of temperature.

The fill fluid density effect error $P_{Error}(T,H)$ is shown in FIG. 3. It is known to nullify the initial pressure error $P_{Error}$ at a given temperature after installing the transmitter and thereby defining height H by calibrating or re-zeroing transmitter 11. Temperature changes relative to the temperature at the last calibration, however, create subsequent variations in the pressure measurement by changing the density of the fill fluid. This "fill fluid density effect," also termed "head temperature effect," is dependent on the distance H, the density of the fill fluid, the coefficient of expansion of the fill fluid, and the change in temperature.

The fill fluid density effect can be expressed as:

$$T_{ERROR} = (H)(S_G)(C)\Delta T \quad \text{EQ. 4}$$

where H is the distance shown in FIG. 1, $S_G$ is the specific gravity of the fill fluid in capillary tube 22, C is the coefficient of thermal expansion of the fill fluid, and $\Delta T$ represents the difference in the temperature of the fill fluid relative the temperature of the fill fluid at the last calibration of transmitter 11.

As set forth in Equation 4 and illustrated graphically in FIG. 3, the fill fluid density effect $P_{Error}$ is proportional to the change in temperature. The slope of the graph of FIG. 3 is given by:

$$\text{Slope} = (H)(S_G)(C) \quad \text{EQ. 5}$$

Thus, where $T_O$ is the temperature of the fill fluid at the last calibration of transmitter 11, the fill fluid density effect for any given temperature T is:

$$T_{ERROR} = \text{Slope} \cdot (T - T_O) \quad \text{EQ. 6}$$

As mentioned above, remote seal capillary systems can successfully compensate for the error generated from fluid expansion due to process and ambient temperatures. However, they require the system to be designed and configured for a specific installation. Current technologies that perform this type of compensation may require a system to be balanced with the same capillary construction, length, and seal type/size on both the high and low pressure side of the pressure transmitter in a differential pressure system. This technology also enables density error compensation in single remote mount seal installations. Current technology may rely on temperature sensors internal to the pressure transmitter which limits the accuracy of the compensation.

In order to calibrate the system, the transmitter gathers an initial pressure reading (i.e. the head pressure generated from fill fluid inside the vertical capillary) and the ambient temperature reading to calculate the vertical distance between process connections. This calculation can be performed automatically as a part of the zero-adjust function upon installation. In an automatic characterization process, an initial pressure reading is obtained after transmitter 11 is installed in an industrial process. This initial pressure reading is essentially the head pressure from the fill fluid inside of the capillary 22. This reading is obtained without any pressure applied to the diaphragm 18 shown in FIG. 1. Additionally, a temperature reading is obtained using temperature sensor 28. A calculation can then be performed automatically, for example as part of a zero-adjust function upon installation. An example calculation is given below in Equation 7:

$$h = \frac{P_{install} - P_{factory}}{SG} \qquad \text{EQ. 7}$$

In Equation 7, $P_{install}$ is the pressure obtained at the installation, $P_{factory}$ is a pressure measurement at zero height obtained during manufacture and SG is the specific gravity of the fill fluid at the measured temperature. The height value then can be used during operation, in conjunction with real-time ambient temperature readings, in some iterations from an external fast responding temperature sensor to compensate for the errors generated from fill fluid density changes in vertically-mounted capillary systems.

Figure 5:
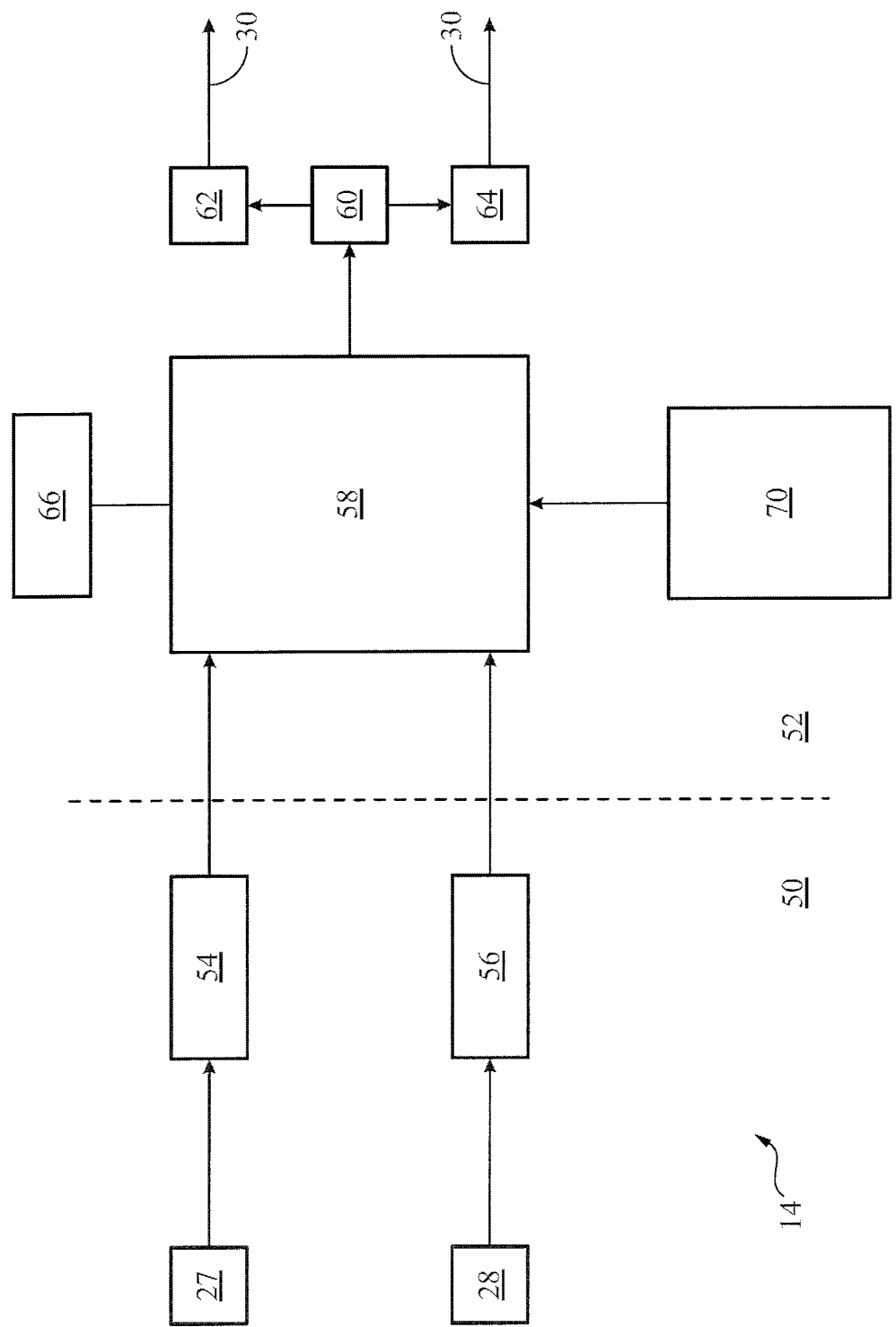
FIG. 5 is a more detailed schematic view of the transmitter of FIG. 1 showing a first embodiment of the present invention.

In another example embodiment, the characterization process can be initiated by a local operator interface. For example, FIG. 1 shows a hand-held calibration unit 31 coupled to two wire process control loop 30. This can be used to send a calibration command to calculation (correction) circuit 58 discussed below in connection with FIG. 5. Another example of the local operator interface is illustrated as element 66 in FIG. 5. In the configuration of FIG. 5, local operator interface 66 can comprise, for example, touch sensitive buttons on a display of the transmitter housing 14, or an externally actuated button. For example, a magnet can be brought in proximity to a region of the transmitter 14 to cause an internal switch to close, thereby initiating the determination of the height H as discussed above. In another example configuration, an RFID tag can be used. In such a configuration, an operator can retrieve a tag of a particular transmitter using an RFID circuit contained in the transmitter. In such a configuration, element 66 shown in FIG. 5 can comprise an RFID circuit. After having obtained the RFID tag information, the operator can download that information into control equipment contained in a control room 32, for example. The control equipment can then be used to transmit a command to the particular transmitter which then begins the commissioning process.

Figure 4:
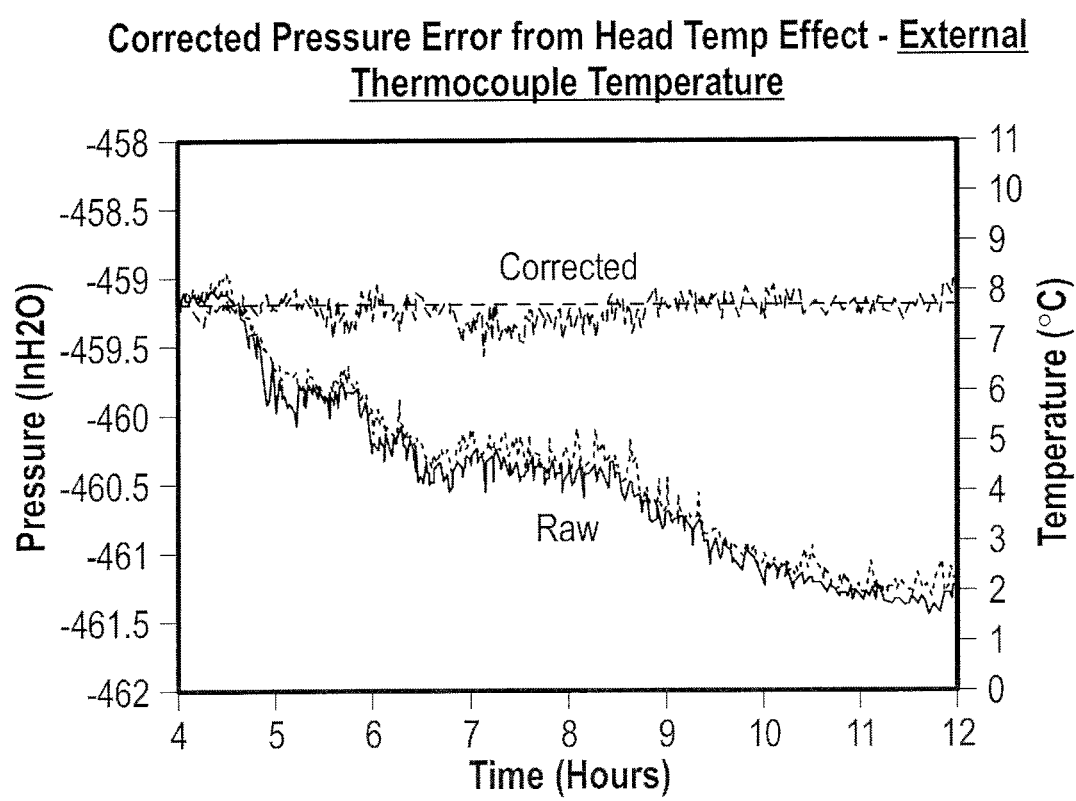
FIG. 4 is a graph of pressure and temperature versus time.

In the experimental data shown in FIG. 4, the lower dotted line is the ambient temperature, the lower solid line is the original pressure reading, and the upper line is the compensated pressure reading. Note that the original pressure reading closely follows the ambient temperature trend.

Equation 8 details how the compensated pressure value, P_corrected, is calculated:

$$P_{corrected} = P_0 - h * SG * \left( \frac{1}{\beta * (T - T_{LZA}) + 1} - 1 \right) \qquad \text{EQ. 8}$$

In Equation 8, $P_0$ is the original pressure reading, h is the vertical distance between process connections (or the process connection and the transmitter isolation diaphragm) which will be automatically calculated upon the user conducting the zero-adjust function, SG is the specific gravity of the remote seal fill fluid (fixed during manufacture), Beta is the thermal expansion of the remote seal fill fluid (fixed at a manufacturing facility or entered using a local operator interface), T is the current ambient temperature, and $T_{LZA}$ is the temperature at which the unit was calibrated at the factory, for example, 25° C.

In one embodiment, transmitter housing 14 is functionally divided between sensor module 50 and electronics module 52, shown in FIG. 5. Sensor module 50 performs tasks related to measuring and compensating process variables. Electronics module 52 performs necessary calculations, data logging and output control functions. Pressure sensor 27 capacitance is provided to Capacitance-to-Digital Application Specific Integrated Circuit (ASIC) 54 which converts the capacitance signal to an intermediate value called "pressure counts," or "pcounts". Temperature sensor 28 provides a signal representative of temperature within the transmitter housing to a Resistance-to-Digital ASIC 56 where the temperature signal is converted into an intermediate value called "tcounts". Pcounts and tcounts are provided to electronics module 52 wherein calculation circuit 58 compensates for fill fluid density effects, and provides a corrected signal representative of the process pressure. Circuit 58 can comprise, for example, a microprocessor. Microprocessor 58 can operate in accordance with instructions stored in memory 70. The corrected signal is typically subjected to further processing at circuit 60 and converted at circuits 62 and 64 to a digital and an analog signal, respectively, suitable for output from transmitter housing 14. Sensor 28 can be located in the transmitter housing 14 as shown in FIG. 1, or can be connected along tube 22 to provide a more accurate temperature measurement.

As discussed above, the thermal effect from fill fluid density is dependent on the vertical position of remote diaphragm systems 12 which can be unique to each installation. According to the invention, characterization information can be stored in memory 70.

Figure 6:
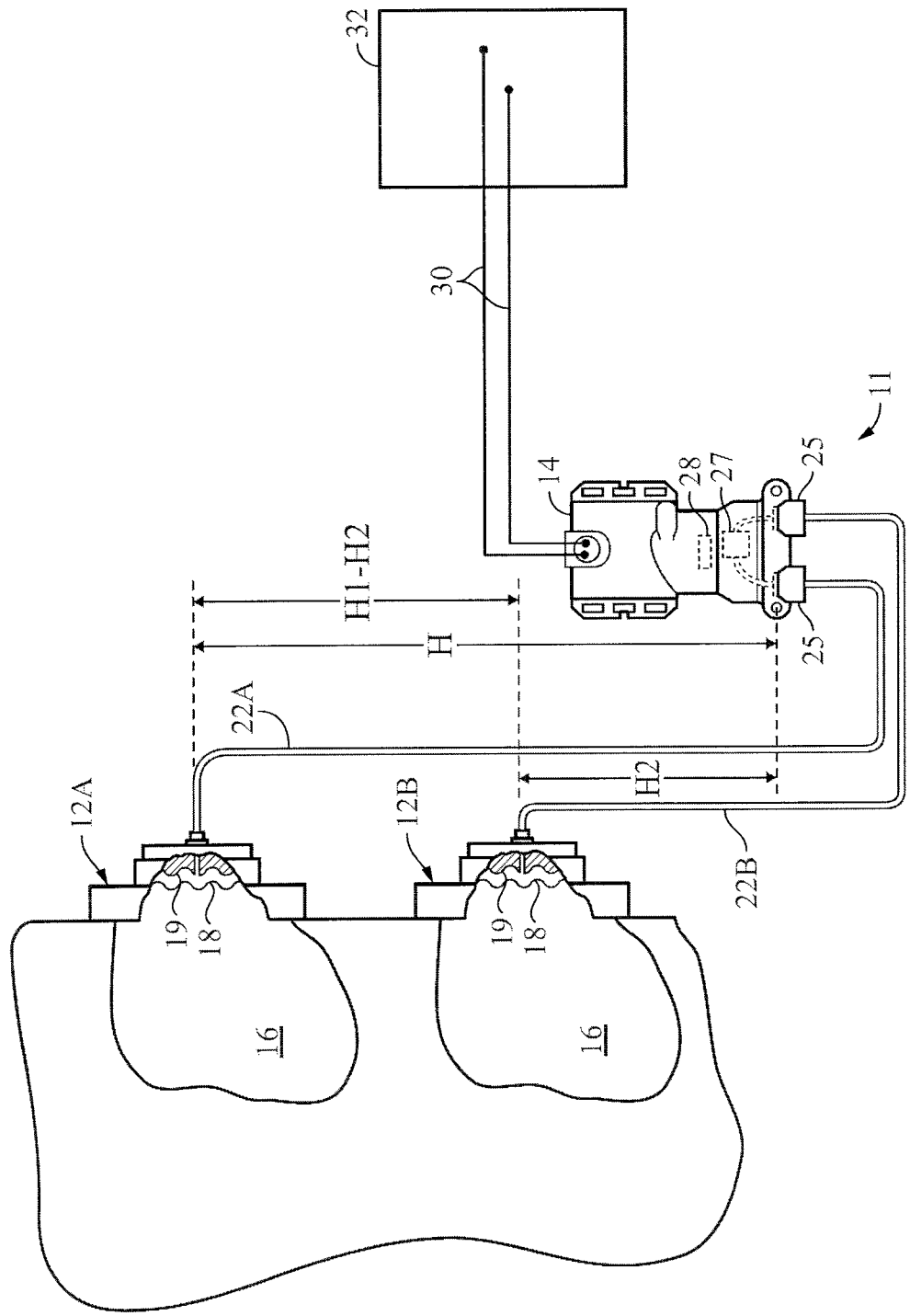
FIG. 6 is another schematic elevational view of the transmitter of FIG. 1 but having a modified remote diaphragm system in an installation where a differential pressure of the process medium is measured

FIG. 6 shows transmitter housing 14 connected to two remote diaphragm systems 12, 12B and suitable for measuring differential pressure of process medium 16. Capillary tubes 22A, 22B connect the respective remote diaphragms to diaphragms 25 at transmitter housing 14. The properties of both remote diaphragms 12A and 12B, and the type and volume of fill fluid in the capillary tubes 22A, 22B, and the elevations $H_1$ and $H_2$, are taken into account in the calculation of the installation-specific coefficients. If capillary tubes 12A, 12B are substantially identical and filled with the same type of fill fluid, then the elevational difference $H_1 - H_2$ can be used to calculate the net fill fluid density effect.

Current technologies that perform this type of compensation typically require a system to be balanced with the same capillary construction, length, and seal type/size on both the high and low pressure side of the pressure transmitter. In contrast, in the instant invention a scaling factor can be calculated based on known system configuration to allow for unbalanced systems to be compensated using the same basic calculation with a scaling factor. As an example, a tuned system, which consists of a close coupled seal and a remote mount seal with capillary mounted at a different height, would require a reduced compensation calculation due to the much lower temperature effects of the close coupled seal. The compensation effect would still be automatically calculated by the previous equations, but a scaling factor can be applied from the factory to reduce the effect as determined by the model configuration or through testing. The scaling factor and other information such as beta, fill fluid specific growth and coefficient of thermal expansion, height h, pressures $P_O$, $P_{factory}$, and $P_{install}$, temperatures T, and $T_{LZA}$, can be stored in memory 70 for use by circuitry 58. Memory 70 and circuitry 58 provide one example of a correcting circuit.

Although the present invention has been described with reference to preferred embodiments, workers skilled in the art will recognize that changes may be made in form and detail without departing from the spirit and scope of the invention.

What is claimed is:

1. A transmitter for measuring a process pressure, comprising:
   a pressure sensor;
   a temperature sensor providing an input temperature signal;
   a first remote pressure sensitive diaphragm coupled to the transmitter by a first capillary tube filled with a fill fluid having a density as a function of fill fluid temperature;
   an input circuit operably connected to at least the pressure sensor, the input circuit providing an intermediate pressure signal at least roughly representative of the process pressure; and
   a correcting circuit operably coupled to the temperature sensor and to the input circuit wherein the correcting circuit processes the intermediate pressure signal by compensating for the fill fluid density based upon a compensation function and the temperature and provides a compensated output more closely representative of the process pressure, the correction circuit further performs an initial height determination based upon a pressure measurement made while no pressure is applied to the first diaphragm.

2. The transmitter of claim 1 wherein the remote pressure sensitive diaphragm is disposed at a vertical position, and wherein the correcting circuit comprises:
   a memory suitable for storing at least one installation-specific correction coefficient representative of the vertical position; and
   a processor operably coupled to the memory wherein the processor accesses the correction coefficient and applies the correction coefficient to the input temperature signal to obtain the compensated output.

3. The transmitter of claim 1 wherein the compensated output is suitable to be digitally output from the transmitter.

4. The transmitter of claim 1 wherein the correcting circuit can be configured for a selected installation of the transmitter.

5. The transmitter of claim 1 wherein the transmitter has a transmitter housing, and wherein the compensating function of the correcting circuit is dependent on an elevation of the first remote pressure sensitive diaphragm relative to the transmitter housing.

6. The transmitter of claim 1 wherein the transmitter is suitable for fluidically coupling the pressure sensor to a second remote diaphragm through a second capillary tube and the compensating function of the correcting circuit is dependent on an elevation of the first remote diaphragm relative to an elevation of the second remote diaphragm.

7. The transmitter of claim 6 wherein the first and second capillary tubes are unbalanced and the compensation function includes a scaling factor.

8. The transmitter of claim 1 wherein the initial height determination is further based upon pressure measured using the pressure sensor during manufacture of the transmitter.

9. The transmitter of claim 1 wherein the initial height determination is performed by the correcting circuit in response to a local operator interface.

10. The transmitter of claim 9 wherein the local operator interface comprises a device connected to the transmitter through a process control loop.

11. The transmitter of claim 10 wherein the local operator interface communicates with the transmitter using a wireless connection.

12. The transmitter of claim 9 wherein the transmitter includes the local operator interface.

13. The transmitter of claim 1 including communication circuitry for communicating with a remote location and wherein the initial height determination is performed by the correcting circuit in response to a communication received through the communication circuitry.

14. The transmitter of claim 13 including an RFID tag for use in identifying the transmitter whereby the initial height determination is communicated to the identified transmitter.

15. The transmitter of claim 1 wherein the initial height determination is a function of a specific gravity of the fill fluid at the measured temperature.

16. A method of correcting pressure measurements in a pressure transmitter having a pressure sensor and a first remote pressure-sensitive diaphragm coupled to the pressure sensor by a first fluid-filled capillary tube, the first remote diaphragm being moveable relative to the pressure transmitter, the pressure transmitter also having a characterization system that receives a pressure signal from the pressure sensor and a temperature signal and provides a transmitter output as a function of the pressure and temperature signals, the method comprising:
   measuring a pressure;
   ascertaining a vertical position of the first remote diaphragm based upon the measured pressure;
   programming the characterization system as a function of the vertical position; and
   correcting a measured pressure value based upon the temperature signal and vertical position using the function.

17. The method of claim 16 wherein the transmitter is suitable for fluidically coupling the pressure sensor to a second remote diaphragm through a second capillary tube and ascertaining a vertical position is dependent on an elevation of the first remote diaphragm relative to an elevation of the second remote diaphragm.

18. The method of claim 17 wherein the first and second capillary tubes are unbalanced and the function further includes a scaling factor.

19. The method of claim 16 wherein ascertaining vertical position is further based upon pressure measured using the pressure sensor during manufacture of the transmitter.

20. The method of claim 16 wherein ascertaining vertical position is performed in response to a local operator interface.

21. The method of claim 16 wherein the ascertaining vertical position is a function of a specific gravity of the fill fluid at the measured temperature.

* * * * *